May 7, 1968   J. A. NEELY, JR   3,381,768
TOWING VEHICLE FOR MOBILE HOMES OR TRAILERS
Filed Nov. 7, 1966   2 Sheets-Sheet 1
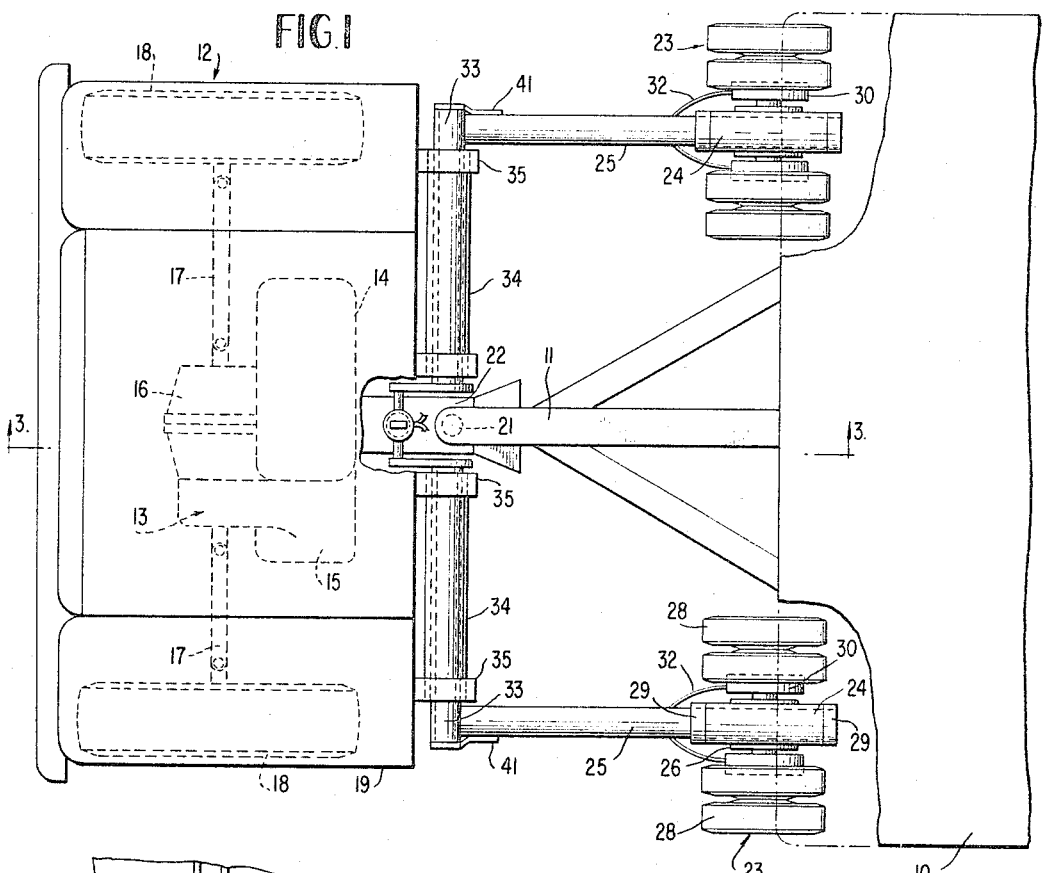
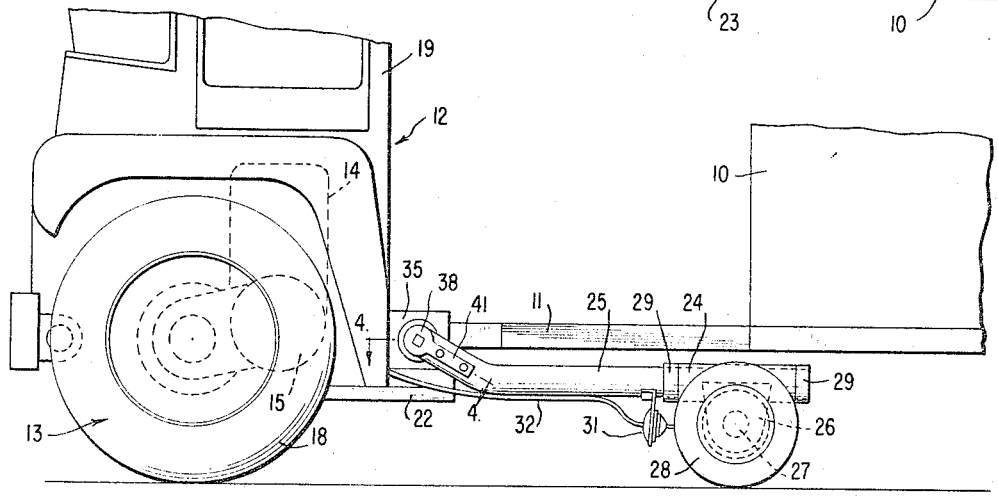
INVENTOR
JOHN ALEXANDER NEELY, JR.
BY *B. P. Fishburn, Jr.*
ATTORNEY May 7, 1968      J. A. NEELY, JR      3,381,768
TOWING VEHICLE FOR MOBILE HOMES OR TRAILERS
Filed Nov. 7, 1966      2 Sheets-Sheet 2
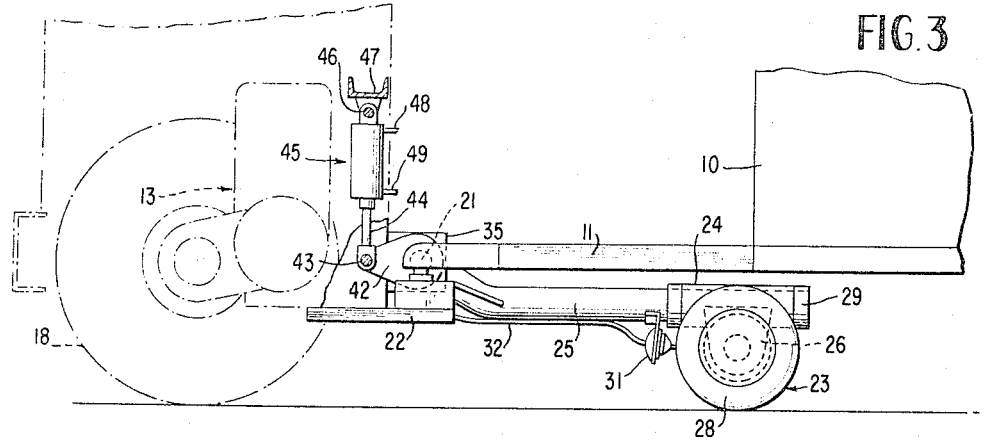
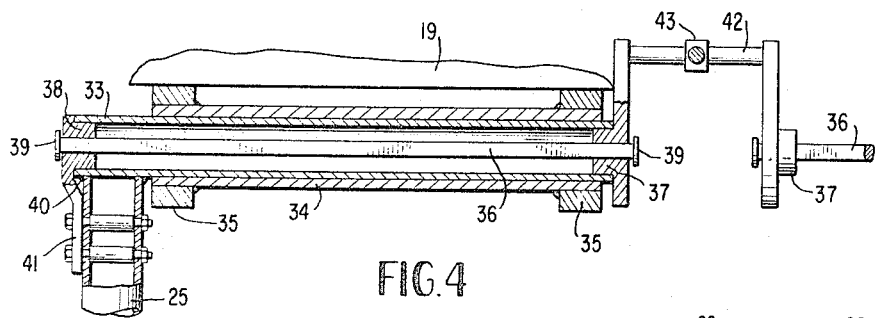
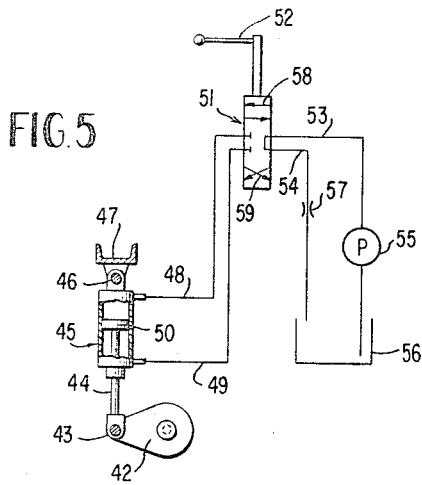
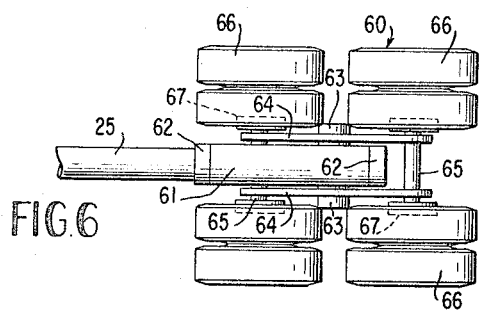
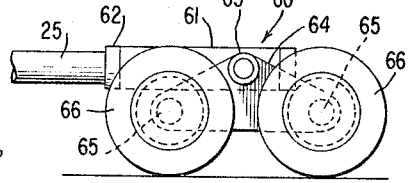
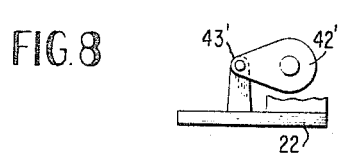
INVENTOR
JOHN ALEXANDER NEELY, JR.
BY *B. P. Fishelman, Jr.*
ATTORNEY

United States Patent Office 3,381,768
Patented May 7, 1968

3,381,768
TOWING VEHICLE FOR MOBILE HOMES OR TRAILERS
John Alexander Neely, Jr., P.O. Box 273,
Anderson, S.C. 29622
Continuation-in-part of application Ser. No. 320,103, Oct. 30, 1963. This application Nov. 7, 1966, Ser. No. 592,488
10 Claims. (Cl. 180—14)

ABSTRACT OF THE DISCLOSURE

A vehicle particularly adapted for towing large mobile homes and other heavy trailers having very low ground clearance. The towing vehicle is characterized by front wheel drive and laterally spaced trailing rear wheel assemblies with a hitch disposed between and well forwardly of the rear wheel assemblies to provide fifth wheel stabilizing of the caravan. The trailing wheel assemblies are of reduced size to permit passage under the draft tongue and floor of the trailer during turning.

This application is a continuation-in-part of my co-pending application Ser. No. 320,103, filed Oct. 30, 1963 for Towing Vehicle for Trailers, now Patent No. 3,285,358.

The object of the present invention is to improve upon and simplify the construction shown in said prior application through the provision of a towing vehicle for large mobile homes of the type having very low ground clearance. According to the present invention, the overall length of the vehicle caravan has been further shortened with a resultant increase in safety and an arrangement has been provided to further simplify the hitching up of the towing vehicle with the trailer or mobile home.

Another object of the present invention is to simplify and improve the mounting or suspension of the rear wheel units and to provide rear wheel brakes for the towing vehicle.

A further important object is to provide a towing vehicle of the mentioned character in which power is applied to the front wheels rather than the rear wheels, resulting in a considerable simplification of the overall structure, the elimination of many parts without loss of their function and a shortening of the caravan, as stated. The present construction enables the hitch element of the towing vehicle to be located extremely close to the front driving wheels.

Another object is to provide rear wheel units or dollies which are readily removable for suspension arms carrying them and which are capable of conforming to the contours of crowned roadways and the like during use.

Other objects and advantages of the invention will become apparent during the course of the following detailed description.

In the accompanying drawings forming a part of this application and in which like numerals are employed to designate like parts throughout the same.

FIGURE 1 is a plan view of a towing vehicle embodying the invention and showing a fragmentary portion of a trailing mobile home;

FIGURE 2 is a side elevational view of the invention;

FIGURE 3 is a longitudinal vertical section taken on line 3—3 of FIGURE 1;

FIGURE 4 is an enlarged fragmentary cross section taken on line 4—4 of FIGURE 2;

FIGURE 5 is a partially diagrammatic view of a fluid pressure operated cylinder-piston unit and control system employed in the invention;

FIGURE 6 is a plan view showing a modification of a rear wheel unit or dolly;

FIGURE 7 is a side elevation of the same; and

FIGURE 8 is a fragmentary side elevational view depicting a slight modification of the vehicle frame structure.

In the drawings wherein for the purpose of illustration is shown a preferred embodiment of the invention, the numeral 10 designates a large type mobile home or trailer having a forwardly extending draft tongue 11 commonly referred to as an A-frame. The forward extremity of the tongue 11 is adapted in a conventional manner to be connected to a ball hitch device on a towing vehicle or some similar known hitch device. The trailer 10 is of the type whose normal ground clearance while the trailer is level is only about sixteen inches, and the elevation of the draft tongue 11 above the ground is normally the same as for the bottom of the trailer as shown in the drawings. Consequently, it should be understood that the draft tongue 11 has a normal elevation during towing much less than the height of standard truck wheels or standard height truck main frames, as explained in said prior application.

The towing vehicle proper forming the subject matter of the invention is indicated generally at 12 and comprises an integrated front driving and steering wheel assembly 13 shown somewhat schematically in the drawings because the assembly 13 may be per se conventional or of a type known in the art. The assembly 13 includes a suitable truck engine 14, gear transmission 15 and differential gear unit 16, all connected as a unit. The differential 16 is connected with and drives front wheel axles 17 having pairs of universal joints, as shown diagrammatically in FIGURE 1. The assembly 13 further includes conventional full-size front wheels 18 equipped with truck-size pneumatic tires. The steering mechanism for the front wheels 18 is conventional and has been omitted in the drawings for simplicity. The towing vehicle 12 includes a cab 19 for the driver above the engine, as shown, and the vehicle 12 includes suitable framing, a rigid portion of which is indicated by the numeral 22.

As shown in FIGURES 1 and 3, the towing vehicle is equipped with a hitch ball element 21 or like device immediately behind the cab 19, at the transverse center of the vehicle and mounted rigidly upon the main vehicle frame portion 22. The elevation of the frame portion 22 is sufficiently low to mount the hitch ball 21 at the proper elevation to receive the low ground clearance draft tongue 11.

The towing vehicle further comprises rear trailing multiple wheel units 23 or dollies which are arranged in widely laterally spaced aligned relation so as to provide an open unobstructed passage at the rear end of the towing vehicle up to the hitch ball or device 21. The hitch device is thus arranged between the dollies 23 and the front wheels 18 so that the weight on the hitch device is well ahead of the rear wheels and distributed on the front and rear wheels of the towing vehicle, thus providing a desirable "fifth wheel" effect when the trailer is hitched up. As shown in the drawings, the overall height of each dolly 23 is such that it may pass bodily under the tongue 11 and the bottom of the mobile home 10 during turning maneuvers and the like.

Each dolly 23 comprises a central tube body 24 mounted rotatably upon a cylindrical rear longitudinal suspension arm 25 which is vertically swingable in a manner to be described. Each tube body 24 carries a depending bracket means 26 rigid therewith supporting a transverse axle 27 upon which inboard and outboard pneumatic tired dual type wheels 28 are mounted rotatably. The wheels 28 lie on opposite sides of the suspension arms 25. Each dolly and its tube body 24 is held against longitudinal displacement on the arm 25 by collars 29, the latter being anchored with set screws or other rigid means. By virtue of this simple arrangement, each dolly 23 can pivot or rotate upon the axis of its suspension arm 25 to conform to the crown of a road or the like. Additionally, by the removal of the rear collar 29, the tube body 24 and the entire dolly may be removed from the arm 25 for replacement or repair and without disturbing the remainder of the towing vehicle structure. The mounting of the dollies 23, while extremely strong and durable, is highly simplified.

The dual wheels 28 of each dolly or unit 23 have conventional brake mechanisms 30 including conventional vacuum or air actuators 31 connected with lines 32 leading to suitable equipment on the towing vehicle, not shown. The front wheels 18 are also equipped with brakes.

The suspension means for the rear dollies 23 includes the previously-mentioned parallel longitudinal arms 25 or tubes having their forward ends securely welded to transverse horizontal cylindrical tubes 33 near the outer ends of the latter. The tubes 33 are journaled for rotation within fixed open-ended bearing sleeves 34 whose end portions may be welded to sturdy bearing blocks 35, in turn rigid with the frame structure of the vehicle. Each suspension arm 25 has its own independent mounting as shown in the drawings and each arm may rise and fall, turning about the axis of the tube 33.

In order to provide resiliency in the suspension of the rear dollies 23, there is provided within each tube 33 a sturdy torsion bar 36, preferably square in cross section, and having its ends supported within plug elements 37 and 38 engaged within the ends of the rotary tube 33. The plugs 37 and 38 have square bores to receive the square torsion bar 36, FIGURE 4. The ends of the bar 36 may be headed as shown at 39 and each torsion bar is slightly longer than the distance between the outer surfaces of plug elements 37 and 38 to compensate for the very slight shortening of the torsion bar when it is twisted. In order to relieve the welding 40 of each arm 25 from direct strain, each plug 38 is securely anchored to the adjacent arm 25 through a bracket extension 41 as shown in FIGURE 4. Therefore, when each arm 25 rises and falls with irregularities in the road under loading, the twisting of the torsion bars 36 is transmitted through the bracket extensions 41 and the plug elements 37 and 38 rather than through the welded joints.

The inner plug elements 37 are formed integral with an eccentric crank structure 42 which extends somewhat forwardly of the common axis through the two torsion bars. If desired, the structure 42 may simply be rigidly connected or integrated with the main frame member 22 of the vehicle as indicated in FIGURE 8 at 42', in which case the inner ends of the two torsion bars 36 will be rigidly held in one position to counteract the twisting action.

In the preferred form of the invention shown in the other views of the drawings, the crank structure 42 is connected at 43 to the rod 44 of an extensible and retractable vertically disposed cylinder-piston unit 45 having its upper end connected at 46 with another fixed frame member 47 of the towing vehicle. The cylinder-piston unit 45 may be recessed slightly into the back wall of the cab 19. As will be further described, the unit 45 may be controlled by the driver of the vehicle to raise and lower the hitch ball 21 and further facilitate the coupling or hitching of the trailer tongue 11 to the towing vehicle and to prevent or resist humping and forward tilting of the towing vehicle caused by the torsion bars 36 when they are completely unloaded as when no trailer is being towed. As will be explained, the unit 45 may be positively locked in a neutral position. The unit 45 is an optional feature of the invention, although a very desirable feature, and when omitted, the structure 42 may simply be a rigid or integral part of the vehicle framework, as stated.

In diagrammatic FIGURE 5, the extensible and retractable hydraulic cylinder-piston unit 45 is shown having hydraulic lines 48 and 49 leading from the opposite ends thereof on the opposite side of a piston 50. These lines lead to and are connected with a three-position reciprocating valve 51 within easy reach of the driver in the cab 19 and having a handle means 52. Additional hydraulic lines 53 and 54 lead from the control valve and connect the valve in fluid circuit with a suitable pump 55, sump 56 and flow restrictor 57. The valve 51 in FIGURE 5 is shown in a neutral position where there is no communication between the lines 54 and 53 and the lines 48 and 49 leading to the cylinder-piston unit 45. With the control valve in this neutral position, the unit 45 is hydraulically locked or rigid and the hitch ball 21 is correspondingly locked at a median elevation. The piston 50 will be at the longitudinal center of the cylinder. The crank structure 42 is locked or rigid just as if it were an integral part of the vehicle frame. The suspension arms 25 are capable of rising and falling and this action will be resisted resiliently by the torsion bars 36 which take the place of coil springs, leaf springs and the like. The arrangement is very strong and highly compact and entirely practical and economical to construct, as shown in FIGURE 4. Substantially a single means on a single transverse axis serves to resiliently and pivotally suspend the rear wheel dollies 23 from the frame of the foreshortened towing vehicle.

By shifting the valve 51 upwardly or downwardly from the neutral position to either of the communicating positions shown by the arrows 58 and 59, the unit 45 may be either extended or retracted so as to effectively raise and lower the hitch element or ball 21. Actually, the unit 45 serves to change the loading on the torsion bars 36 and thus change the height of the vehicle frame portion 22 and consequently the height of the hitch ball 21. The restrictor 57 serves at this time to restrict the flow through the control valve so that greater accuracy can be achieved in adjusting the height of the hitch ball. When the towing vehicle is entirely unloaded, as when returning from a delivery point without any trailer, the unit 45 may be retracted by use of the valve 51 so as to place an artificial loading on the torsion bars 36 and thereby resist any tendency to hump which the unloaded towing vehicle might develop. This increases the safety of driving the unloaded towing vehicle at highway speeds.

When the operation of coupling or hitching up with the mobile home takes place, the draft tongue 11 will normally be supported on a leg or jack as when the trailer is parked. The split or divided rear end of the towing vehicle 12 enables the same to back around the leg supporting the tongue 11 and at the proper moment, the hitch ball 21 may be adjusted vertically by use of the control valve 51 and the hitching up accomplished. After this adjustment and hitching, the valve may be manipulated to hydraulically lock the extensible and retractable unit 45 and the caravan is ready to move over the road with safety and stability, not otherwise obtainable with full height towing trucks having some type of depressed rear end hitch behind the rear axle and rear wheels, as explained in said prior application. The trailing low silhouette dollies 23 are independently resiliently suspended in a very simplified manner and the inboard and outboard dual wheels provide a large area of contact with the road to minimize wear on the relatively small tires. The entire dolly 23 is quickly removable from the suspension arm 25, as explained previously.

FIGURES 6 and 7 show a modification of the rear wheel units or dollies indicated generally by the numeral 60. As previously described, the dolly 60 includes a tube body 61 which mounts telescopically and rotatably on the arm 25 between a pair of collars 62. Therefore, the entire dolly can pivot laterally as in the prior form of the invention. The tube body 61 has opposite side trunnions 63 rigid therewith from which wheel axle mounting brackets 64 are pivotally suspended, said brackets supporting forward and rear axles 65, which carry the inboard and outboard pairs of dual wheels 66, as shown. The dolly may be equipped with brakes 67, as described in the prior embodiment. In the modification, FIGURES 6 and 7, twice as many rubber tired wheels engage the road and the dolly may pivot about two independent axes, namely, the axes of the arm 25 and trunnions 63, which axes are at right angles. The advantages of the construction are substantially obvious, and the modified form of dolly may be used on the same suspension arms 25 which mount the more simplified dolly 23. The use of the dollies 60 in no way detracts from the other features of the invention and the general mode of operation is unchanged.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A vehicle adapted particularly for towing a large low ground clearance trailer having a forwardly extending draft tongue substantially at its bottom, said towing vehicle comprising a front wheel drive power unit having a driver support, a weight bearing free swiveling type hitch on the rear of the power unit substantially at the transverse center thereof capable of providing fifth wheel effect when coupled up to a trailer, and a pair of trailing reduced height wheel assemblies connected with the rear of the power unit near opposite sides thereof, said trailing wheel assemblies spaced laterally from opposite sides of the hitch and spaced rearwardly thereof and providing an unobstructed passage rearwardly from the hitch through the rear end of the towing vehicle, said trailing wheel assemblies capable of passing beneath the draft tongue and the bottom of the trailer during turning and said towing vehicle capable of backing into a hitching-up position with the trailer.

2. A vehicle as defined by claim 1, wherein the height of said hitch on the rear of said power unit is at such an elevation that it may receive a trailer draft tongue while the latter is approximately level.

3. A vehicle as defined by claim 2, and where each of said trailing wheel assemblies includes a generally horizontal longitudinal arm near one side of the towing vehicle with the forward end thereof connected to the rear of the power unit.

4. A vehicle as defined by claim 1, and resilient means interconnecting the power unit and the trailing wheel assemblies, whereby said wheel assemblies may rise and fall independently.

5. A vehicle as defined by claim 4, wherein the resilient means comprises transversely extending torsion bar means on the rear of the power unit and said trailing wheel assemblies include longitudinal arm means connected with said torsion bar means.

6. A vehicle as defined by claim 5, wherein the torsion bar means is disposed substantially at the elevation of said hitch.

7. A vehicle as defined by claim 1, and braking means connected with said trailing wheel assemblies and being operable by the driver of the vehicle.

8. A vehicle adapted particularly for towing a large low ground clearance trailer having a forwardly extending draft tongue substantially at its bottom, said towing vehicle comprising a front wheel drive power unit having a driver support, a weight supporting free swiveling type hitch on the rear of the power unit substantially at the transverse center of the vehicle, a pair of trailing reduced height wheel assemblies spaced laterally from opposite sides of the hitch and spaced rearwardly thereof, whereby an unobstructed passage is provided rearwardly from the hitch through the rear end of the towing vehicle, longitudinal arms connected with said trailing wheel assemblies and extending forwardly thereof, transversely extending torsion bars mounted upon the rear of said power unit and connected with the forward ends of said arms, a crank structure connected with corresponding ends of the torsion bars, and power means connected with the crank structure to turn the same for adjusting the tension of the torsion bars.

9. A vehicle as defined by claim 8, wherein the power means comprises a fluid pressure operated cylinder-piston unit having a connection with said crank structure, and control valve means connected with the cylinder-piston unit operable to turn the crank structure and to lock the same against turning in a selected adjusted position.

10. A vehicle as defined by claim 8, and wherein said trailing wheel assemblies include longitudinally extending tube bodies telescopically and swivelly mounted on the rear end portions of said arms.

References Cited

UNITED STATES PATENTS

| 2,121,862 | 6/1938 | Dodge | 280—81 |
| 2,317,972 | 5/1943 | Ash | 180—14 |
| 2,587,624 | 3/1952 | Johnson | 280—43.23 X |
| 2,869,887 | 1/1959 | Westberg | 280—43.23 |
| 2,925,135 | 2/1960 | Hamilton | 180—12 |

FOREIGN PATENTS

| 599,711 | 7/1934 | Germany. |

KENNETH H. BETTS, *Primary Examiner.*

BENJAMIN HERSH, *Examiner.*

C. C. PARSONS, *Assistant Examiner.*